United States Patent
Wolf et al.

(10) Patent No.: US 10,279,790 B2
(45) Date of Patent: May 7, 2019

(54) MASTER BRAKE CYLINDER ARRANGEMENT FOR A HYDRAULIC MOTOR VEHICLE BRAKE SYSTEM

(71) Applicant: Lucas Automotive GmbH, Koblenz (DE)

(72) Inventors: Matthias Wolf, Koblenz (DE); Martin Struschka, Braubach (DE)

(73) Assignee: Lucas Automotive GmbH, Koblenz (DE)

( * ) Notice: Subject to any disclaimer, the term of this patent is extended or adjusted under 35 U.S.C. 154(b) by 82 days.

(21) Appl. No.: 15/549,219

(22) PCT Filed: Jan. 12, 2016

(86) PCT No.: PCT/EP2016/050413
§ 371 (c)(1),
(2) Date: Aug. 7, 2017

(87) PCT Pub. No.: WO2016/128159
PCT Pub. Date: Aug. 18, 2016

(65) Prior Publication Data
US 2018/0029579 A1    Feb. 1, 2018

(30) Foreign Application Priority Data
Feb. 12, 2015   (DE) .................. 10 2015 001 860

(51) Int. Cl.
*B60T 11/232*   (2006.01)
*B60T 11/236*   (2006.01)
(Continued)

(52) U.S. Cl.
CPC .......... *B60T 11/236* (2013.01); *B60T 11/232* (2013.01); *F15B 7/08* (2013.01); *F16J 15/3284* (2013.01)

(58) Field of Classification Search
CPC .... B60T 11/232; B60T 11/236; F16J 15/3284
(Continued)

(56) References Cited

U.S. PATENT DOCUMENTS

| 7,104,059 B2 | 9/2006 | Tsubouchi et al. |
| 2008/0264248 A1* | 10/2008 | Okada .................. B60T 11/236 92/169.1 |

FOREIGN PATENT DOCUMENTS

| DE | 102004057253 A1 | 7/2005 |
| DE | 102009052568 A1 | 5/2011 |

(Continued)

OTHER PUBLICATIONS

German Search Report, Application No. DE102015001860.4 dated Sep. 11, 2015.
(Continued)

*Primary Examiner* — Nathaniel E Wiehe
*Assistant Examiner* — Daniel S Collins
(74) *Attorney, Agent, or Firm* — MacMillan, Sobanski & Todd, LLC

(57) ABSTRACT

A master brake cylinder arrangement for a hydraulic motor vehicle brake system, comprising a master brake cylinder housing with a cylindrical recess and at least one substantially annular groove which is oriented transversally to a longitudinal axis of the cylindrical recess and which is axially delimited by a protruding housing portion. The master brake cylinder arrangement also comprises at least one pressure piston which can be displaced axially in the cylindrical recess of the master brake cylinder housing and which is guided in a sealed manner by means of at least one seal element arranged in the groove. The housing portion has an edge portion which faces the seal element and an edge portion which faces away from the seal element when viewed in the axis-containing longitudinal section. The edge
(Continued)

portion facing the seal element and the edge portion facing away from the seal element have a curved contour when viewed in the axis-containing longitudinal section, the edge portion facing the seal element and the edge portion facing away from the seal element being curved to different degrees.

10 Claims, 3 Drawing Sheets

(51) Int. Cl.
*F15B 7/08* (2006.01)
*F16J 15/3284* (2016.01)

(58) Field of Classification Search
USPC .......................................................... 60/585
See application file for complete search history.

(56) References Cited

FOREIGN PATENT DOCUMENTS

| | | |
|---|---|---|
| EP | 2165897 A1 | 3/2010 |
| EP | 2487082 A1 | 8/2012 |
| JP | 2011156920 A | 8/2011 |

OTHER PUBLICATIONS

PCT Search Report and the Written Opinion, Application No. PCT/EP2016/050413 filed Jan. 12, 2016, dated Apr. 12, 2016.

\* cited by examiner

MASTER BRAKE CYLINDER ARRANGEMENT FOR A HYDRAULIC MOTOR VEHICLE BRAKE SYSTEM

CROSS-REFERENCE TO RELATED APPLICATIONS

This application is a national stage of International Application No. PCT/EP2016/050413, filed 12 Jan. 2016, the disclosures of which are incorporated herein by reference in entirety, and which claimed priority to German Patent Application No. 10 2015 001 860.4, filed 12 Feb. 2015, the disclosures of which are incorporated herein by reference in entirety.

BACKGROUND OF THE INVENTION

The invention relates to a master brake cylinder arrangement for a hydraulic motor vehicle brake system, comprising a master brake cylinder housing with a cylindrical recess and at least one substantially annular groove, which is oriented transversally to a longitudinal axis of the cylindrical recess, wherein the groove is axially delimited by a protruding housing portion, and at least one pressure piston, which can be displaced axially in the cylindrical recess of the master brake cylinder housing and is guided in a sealed manner by means of at least one seal element, wherein the seal element is arranged in the groove. The housing portion has an edge portion facing the seal element and an edge portion facing away from the seal element when viewed in an axis-containing longitudinal section.

Such a master brake cylinder arrangement is known, for example, from the document DE 10 2004 057 253 A1. In the master brake cylinder described therein, a primary piston and ahead of the primary piston a secondary piston are taken up displaceably in a cylinder body. In respective grooves formed in an inner wall of the cylinder body, primary sleeves, a secondary sleeve and a pressure sleeve are taken up. Annular wall portions are formed in one piece on the inner wall of the cylinder body behind the respective primary sleeves to support the primary sleeves individually.

In master brake cylinder arrangements known from the prior art, a fluidic connection exists between a pressure chamber delimited by the pressure piston and a fluid reservoir fluidically coupled to the cylindrical recess in an initial state before actuation of the brake, in which state the pressure piston is pretensioned in a resting position by a reset spring. This fluidic connection is guaranteed by holes in a hollow cylindrical portion of the pressure piston. In the initial state, the pressure piston is positioned in such a way that the holes are positioned in an axial direction between two seal elements (sealing sleeves) enclosing the pressure piston.

At the beginning of a brake actuation, an external force acts upon the pressure piston, due to which it is moved from its resting position in the direction of the pressure chamber. The volume of the pressure chamber is steadily reduced by this, so that brake fluid escapes from the pressure chamber through the holes into the fluid reservoir. As soon as the holes reach the seal element, the flow through the holes to the fluid reservoir is obstructed and the pressure in the pressure chamber rises gradually until the holes are completely sealed off by the seal element (so-called "delayed pressure build-up"). As the pressure increases, the seal element is deformed elastically on account of the raised fluid pressure in the pressure chamber, wherein it at least partially pushes through the gap between the pressure piston and the protruding housing portion depending on the fluid pressure prevailing. In the case of high brake pressures, which can occur in emergency braking operations, for example, it can even occur that the seal element not only completely fills the gap, but is partially pressed out beyond the end of the gap. This situation is shown in a highly schematised manner in FIG. 5.

As soon as the brake is released again, the pressure piston is moved back into its resting position by the reset spring. The volume of the pressure space increases thereby, the pressure prevailing therein falls and hydraulic fluid flows back into the pressure space as soon as the holes formed in the pressure piston are released by the seal element. However, in fast reset processes of the pressure piston in particular, it can occur on resetting that the part of the seal element pushed through the gap between the pressure piston and the radially inner wall of the master brake cylinder housing contracts more slowly than the pressure piston moves back. The tensions acting in this case in the seal element can result in damage to the seal element.

To counter this problem, it is known from the prior art to bevel the edge of the protruding housing portion facing away from the seal element. A configuration of this kind can have a disadvantageous effect on the precision of the action of the motor vehicle brake system, however. In particular, this can lead to the pressure build-up in the pressure space only commencing late in relation to the piston movement and thus a relatively great idle path of the brake piston occurs. To overcome this idle path, the vehicle driver would have to move the brake pedal/the brake lever relatively far from its resting position before a brake effect occurs.

BRIEF SUMMARY OF THE INVENTION

A feature of the present invention is therefore to provide a master brake cylinder arrangement of the type described at the beginning that is durable and at the same time conveys a direct brake feeling.

This feature is achieved by a master brake cylinder arrangement of the type described at the beginning, in which the edge portion facing the seal element and the edge portion facing away from the seal element have a curved, preferably harmoniously curved, contour when viewed in the axis-containing longitudinal section. The edge portion facing the seal element and the edge portion facing away from the seal element are curved in this case to a different extent. In particular, it can be provided that the edge portion facing away from the seal element is curved more strongly than the edge portion facing the seal element.

In the context of the present application, the expressions "edge portion facing/facing away from the seal element" refer to the seal element in the initial state (i.e. in the non-deformed state), in which the seal element is arranged in the groove and is largely unloaded. In this state the seal element does not extend in particular into the gap between the protruding housing portion and the wall of the cylindrical recess.

The configuration of the master brake cylinder arrangement according to the invention offers the advantage in particular that the seal element is not damaged on sharp edges. Moreover, such a configuration makes it possible for the dynamic pressure at the constriction between pressure piston and protruding housing portion to develop relatively rapidly, so that the pressure build-up starts spontaneously in response to the piston movement. A large idle path is thus avoided. The combination of two curved edge portions has a synergetic effect insofar as the seal element is protected from being damaged on account of high tensions between the pressure piston and the protruding housing portion on the one hand, and on the other hand the curvature provided on the side of the protruding housing portion facing away from the seal element can be adapted so that the pressure in the pressure chamber rises even in the event of small pressure piston deflections. This means that the delay in the pressure increase is kept comparatively small. Furthermore, the axial length of the housing portion can be kept short, so that the master brake cylinder arrangement requires little installation space.

According to the invention, the protruding housing section and/or the groove can be oriented likewise parallel to one another and/or transversally to the longitudinal axis of the cylindrical recess, in particular can run at a right angle to the longitudinal axis of the cylindrical recess. The contour of the edge portion facing the seal element and/or of the edge portion facing away from the seal element that is curved (i.e. rounded) in the longitudinal section containing the axis is preferably circular when viewed in the axis-containing longitudinal section. Alternatively it can be provided according to the invention that the contour(s), when viewed in the axis-containing longitudinal section, is/are configured in particular completely parabolically or harmoniously rounded in another shape, at least in portions. In all these configurations the protruding housing portion is free of stepped transitions of the sharp edges. At the same time, master brake cylinder housings with such a housing portion can be produced comparatively inexpensively.

If the contours are configured to be circular, the edge portion facing the seal element can have a first radius of curvature in particular that is at least five times, for example ten times, as great as a second radius of curvature that the edge portion facing away from the seal element has. It has been established by means of CFD (Computational Fluid Dynamics) simulations that the problem underlying the invention is solved especially advantageously if the protruding housing portion of the master brake cylinder housing has an axial length of between 0.6 and 1.0 mm and the gap between the pressure piston and the housing portion (in a radial direction) is between 0.07 and 0.2 mm wide at the narrowest point. The first and the second radius of curvature in this case are preferably 0.5 to 0.8 mm and 0.04 to 0.1 mm. In one design variant the gap at the narrowest point is 0.16 and 0.11 mm wide, the housing portion is 0.9 mm long in an axial direction and the first and the second radius of curvature are 0.7 mm and 0.05 mm. In this embodiment according to the invention the first radius of curvature is 14 times as great as the second radius of curvature.

In another embodiment of the invention, the seal element is produced from a viscoelastic material at least in portions. Viscoelastic materials are characterised in that they are deformed elastically and flow when acted upon by a force. The seal element can consist entirely of the viscoelastic material, for example. However, it can also be viscoelastic only in the region adjacent to the pressure piston. The viscoelastic material can be a rubber material, for example. A seal element of this kind is comparatively easy and inexpensive to produce in large numbers. The configuration of the protruding housing portion according to the invention makes it possible in this case to design the seal element to be more flexible, for example, more universal. In particular, on account of the interaction of the rounded contours of the edge portions, a comparatively soft rubber material can also be used, which reliably seals the pressure piston relative to the master brake cylinder housing even at comparatively low pressures prevailing in the pressure chamber. On account of the flow effect in particular the seal element can penetrate deep into the gap between the protruding housing portion and the pressure piston. The degree of flow of the seal element is significantly determined according to the invention by the geometry of the components delimiting the seal element, thus by the circumference of the pressure piston as well as the contour and size of the housing portion.

In a development of the invention, on a side of the protruding housing section that delimits the groove, which side faces away from the groove, a further groove is formed in the master brake cylinder housing. This further groove can be brought into flow connection with a fluid compensating reservoir connection. In particular, a hole can be formed in the master brake cylinder housing between this further groove and the fluid compensating reservoir connection, through which hole the fluid escaping from the pressure chamber through the holes in the piston skirt of the pressure piston can be displaced into the fluid compensating reservoir.

It can further be provided according to the invention that the edge portion facing the seal element abuts the edge portion facing away from the seal element. In other words, the edge portion facing the seal element has a fluent transition into the edge portion facing away from the seal element. The transition is preferably continuous. It is guaranteed thereby that the seal element can effectively seal the gap between the pressure piston and the radially inner wall of the cylindrical recess, so that no fluid leakage takes place from the pressure space, for example into the fluid compensating reservoir. It is also ensured in this way that as little volume as possible of the seal element stands above the protruding housing portion and blocks the fluid compensating reservoir connection, even in the event of high forces acting on the pressure piston.

If the edge portion facing the seal element abuts the edge portion facing away from the seal element, it is also provided according to the invention that the boundary between the two edge portions is arranged in an axial direction at that point in the longitudinal section containing the axis at which the gap between the protruding housing portion and the outer circumferential surface of the pressure piston is narrowest. The axial distance between the boundary and the groove taking up the seal element is preferably greater than the axial distance between the boundary and a side of the housing portion facing away from the groove. For example, the distance between the boundary and the groove can be roughly three quarters of the axial length of the protruding housing portion.

In another embodiment of the invention, it is provided that a transition portion of the housing portion is formed in the direction of the longitudinal axis of the cylindrical recess between the edge portion facing the seal element and the edge portion facing away from the seal element, which transition portion extends at least in portions, preferably completely, in a linear manner and substantially parallel to the longitudinal axis of the cylindrical recess. In this transition portion the radially inner wall of the master brake cylinder housing is thus configured as a cylinder shell surface. This region can be less than a quarter of the axial length of the housing portion, for example.

Alternatively it can be provided according to the invention that the transition portion is not linear, but has a curved contour, at least in portions, when viewed in its axis-containing longitudinal section. In this case the transition portion is preferably curved more strongly than the edge portion facing the seal element, but more weakly than the edge section facing away from the seal element. An edge-free, fluent transition in particular can be realised between the differently curved edge portions by this. Small idle paths can be realised in that the material properties of the seal element and the shape of the protruding housing portion are matched to one another. In particular, if the seal element is viscoelastic it can cling to the housing portion and seal the gap between the pressure piston and the wall of the cylindrical recess effectively.

The invention further relates to a motor vehicle brake system with a master brake cylinder arrangement of the type described above. The master brake cylinder arrangement of the motor vehicle brake system can have each of the features previously explained in detail.

Other advantages of this invention will become apparent to those skilled in the art from the following detailed description of the preferred embodiments, when read in light of the accompanying drawings.

DETAILED DESCRIPTION OF THE INVENTION

Figure 2:
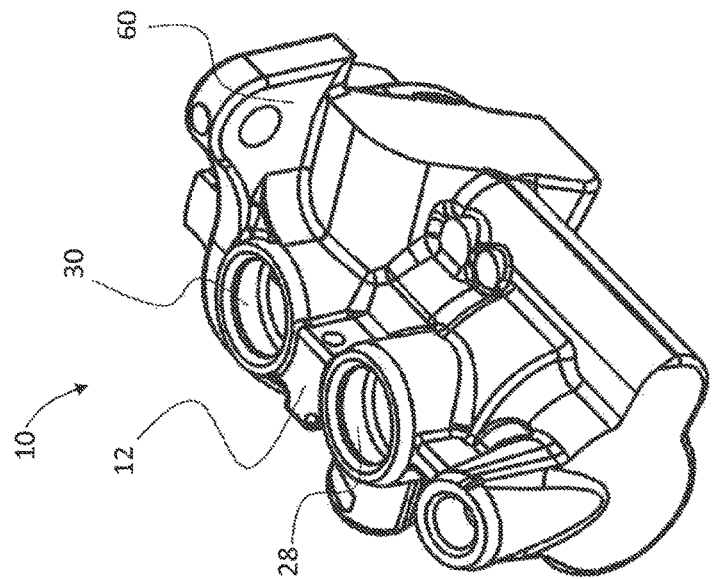
FIG. 2 is an overall view in perspective of the master brake cylinder arrangement from FIG. 1 in a viewing direction from the side and above.
Figure 1:
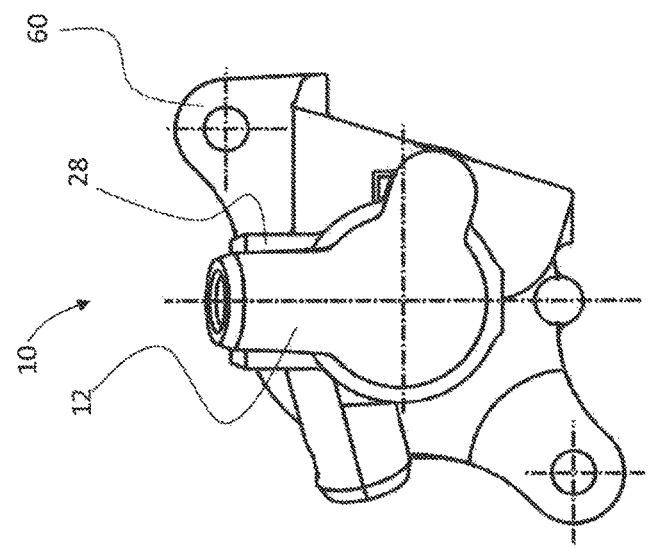
FIG. 1 is a side view of a master brake cylinder arrangement according to the invention in a viewing direction along the longitudinal axis of the cylindrical recess.
Figure 3:
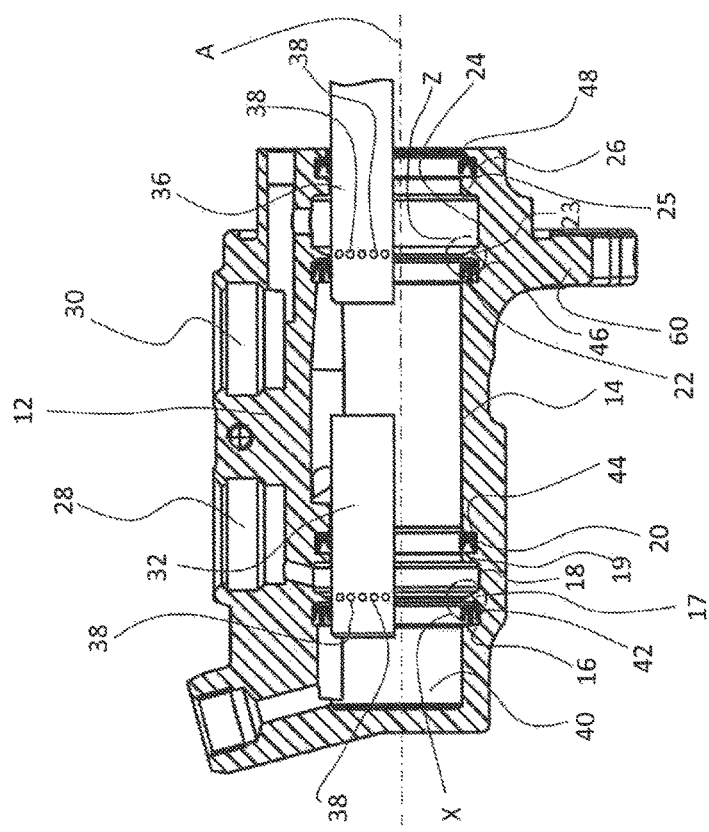
FIG. 3 is an axis-containing longitudinal section view of the master brake cylinder arrangement from FIG. 1.

In FIGS. 1 to 3, overall views of a master brake cylinder arrangement 10 according to the invention for a hydraulic motor vehicle brake system are shown. The master brake cylinder arrangement 10 comprises a master brake cylinder housing 12 with a cylindrical recess 14, which housing can be attached optionally directly or indirectly to a portion of a vehicle body via an attachment flange 60. For example, the master brake cylinder housing 12 can be attached via the attachment flange 60 to a brake servo connected upstream of the master brake cylinder arrangement 10. Six grooves 16, 18, 20, 22, 24, 26 are formed in the master brake cylinder housing 12. Taken up respectively in each of the grooves 16, 20, 22 and 26 accordingly is a seal element 42, 44, 46, 48 in the form of a sealing collar. The grooves are arranged spaced at a distance axially from one another.

The grooves 18 and 24, in which no seal element is arranged, are formed between the grooves 16 and 20 and 22 and 26 respectively. These grooves 18 and 24 each have a flow connection to a fluid compensating reservoir connection (so-called reservoir connection port) 28, 30. All grooves 16, 18, 20, 22, 24, 26 are delimited by protruding housing portions (in an axial direction, at least on one side). In particular, the groove 16 is delimited by the housing portion 17, which is arranged axially between the groove 16 and the groove 18, and the protruding housing portion 19 delimits each of the grooves 18 and 20. The protruding housing portion 23 further delimits each of the grooves 22 and 24 and the protruding housing portion 25 each of the grooves 24 and 26.

The master brake cylinder arrangement 10 shown in the figures is a so-called tandem master brake cylinder arrangement, which is provided for two brake circuits, which are actuated by way of the same brake pedal or the same brake lever. The master brake cylinder arrangement 10 accordingly comprises two pressure pistons 32, 36, which are displaceable axially along a longitudinal axis A in the cylindrical recess 14 of the master brake cylinder housing 12, and which are only partially shown in the exemplary embodiment shown and are formed substantially identically. Both pressure pistons 32, 36 extend axially in the cylindrical recess and respectively have several identical holes 38 on their circumferential surfaces, which holes are arranged adjacent to the end of the respective pressure piston facing a pressure chamber 40. The pressure piston 32 is guided in a sealed manner by means of the seal elements 42, 44 and the pressure piston 36 is guided in a sealed manner by means of the seal elements 46, 48.

Figure 4A:
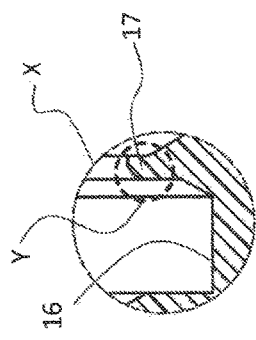
FIG. 4a is a partially detailed view of the section designated X from FIG. 3, in which the protruding housing portion and the annular groove are shown in portions.
Figure 4B:
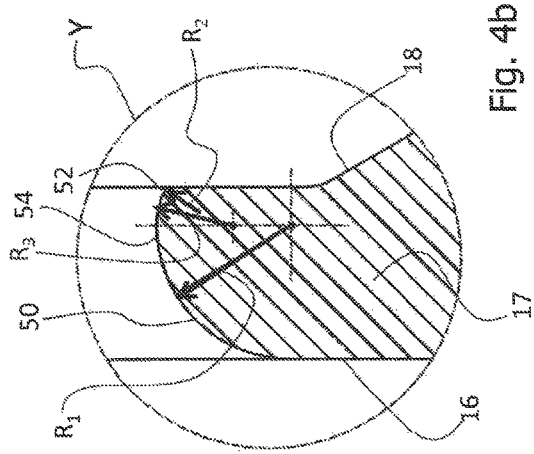
FIG. 4b is a partially detailed view of the section designated Y from FIG. 4a, in which the protruding housing portion and the annular groove are shown in portions.

FIG. 4a shows the region X encircled by a dotted and dashed line in FIG. 3 and FIG. 4b shows the region Y encircled by a dashed line in FIG. 4a in an enlarged form. The region Z encircled by a dotted and dashed line in FIG. 3 is not reproduced enlarged in the figures and this region Z is not considered in greater detail below. Since the parts of the master brake cylinder arrangement 10 arranged in this region Z are configured the same as the parts arranged in region X, the statements made below with regard to the section X apply accordingly to the region Z. Since in particular the (protruding) housing portions 17 and 23 are configured substantially identically, only the function of the housing portion 17 delimiting the grooves 16 and 18 is explained further below; the statements apply accordingly to the housing portion 23 delimiting the grooves 22 and 24.

As is to be recognised from FIGS. 3, 4a and 4b, the protruding housing portion 17 has an edge portion 50 (on the left in the figures) facing the seal element and an edge portion 52 (on the right in the figures) facing away from the seal element. In FIGS. 4a and 4b, the seal element 16 is not shown. Corresponding to the only partial representation of the pressure piston 32 in FIG. 3, the pressure piston is likewise not represented in FIGS. 4a and 4b. To clarify the arrangement of pressure piston, seal element and housing portion, reference is made accordingly to FIG. 6, which shows the same region of the master brake cylinder arrangement 10 in a cross sectional view.

Figure 6:
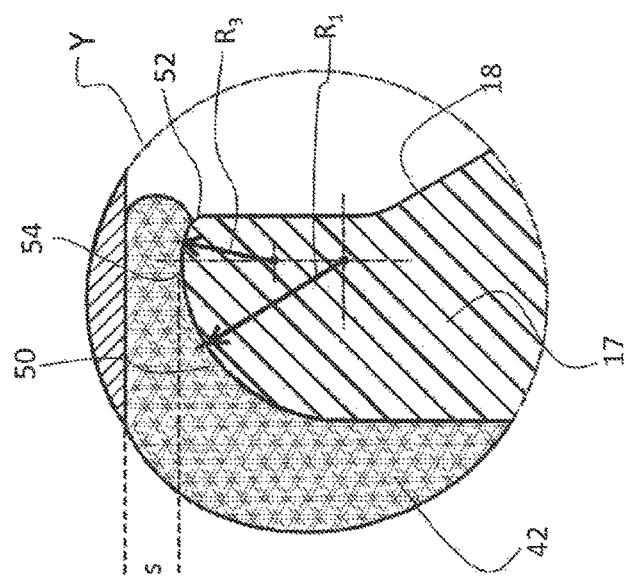
FIG. 6 is a partially detailed view of the section designated Y from FIG. 4a, in which the protruding housing portion, the seal element, the pressure piston and the annular groove are shown in portions.

FIGS. 4b and 6 show that the edge portion 52 on the right in the figures (i.e. facing away from the seal element 42) is more strongly curved than the edge portion 50 on the left in the figures (facing the seal element 42). As already explained, reference is made in this case to the design and arrangement of the seal element 42 in the non-deformed state, in which the seal element 42 in particular does not extend beyond the lateral edges of the groove 16. The curvatures of the edge portions 50 and 52 are shown circular in the figures. The edge portion 50 facing the seal element in the longitudinal section from FIGS. 4b and 6 accordingly has a contour with a first radius of curvature $R_1$ and the edge portion 52 facing away from the seal element 42 has a contour with a second radius of curvature $R_2$. In the master brake cylinder arrangement 10 shown in the figures, the radius of curvature $R_1$ is roughly fourteen times as great as the second radius of curvature $R_2$. In particular, the radius of curvature $R_1$ is 0.7 mm and the radius of curvature $R_2$ is 0.05 mm. The figures are not shown true to scale for a clear visualisation.

The seal element 42 consists completely of a viscoelastic rubber, so that a part of the seal element penetrates into the gap between the pressure piston 32 and the housing portion 17 as a consequence of the pressurisation of the fluid present in the pressure chamber 40. The gap has a radial width s of 0.11 mm. Thus a part of the seal element is located in a pressurised state of the pressure chamber 40 between the edge portions 50, 52 and the pressure piston 32.

In the master brake cylinder arrangement 10, a transition portion 54 of the housing portion 17 is formed in the direction of the longitudinal axis A between the edge portion 50 facing the seal element and the edge portion 52 facing away from the seal element. In the axis-containing longitudinal section view in FIGS. 4b and 6 the contour of this transition portion 54 has a third radius of curvature $R_3$, which is greater than the radius of curvature $R_2$, but smaller than the radius of curvature $R_1$. The transitions between the edge portions and the transition portion 54 are fluent in each case. The shell surface of the housing portion 17 is substantially step- and edge-free.

Alternatively the transition portion 54 can be designed to be linear, i.e. non-curved, and extend in particular parallel to the longitudinal axis A. In this embodiment, which is not shown in the figures, the edge portion 50 extends substantially about a quarter arc of a circle. On account of the circular curvature of the portions 50 and 52 in the longitudinal section containing the axis, a continuous transition can be realised between the edge portions in this embodiment also. Similarly, even in an alternative embodiment the edge portion 50 facing the seal element can directly abut the edge portion 52 facing away from the sealing element.

Figure 5:
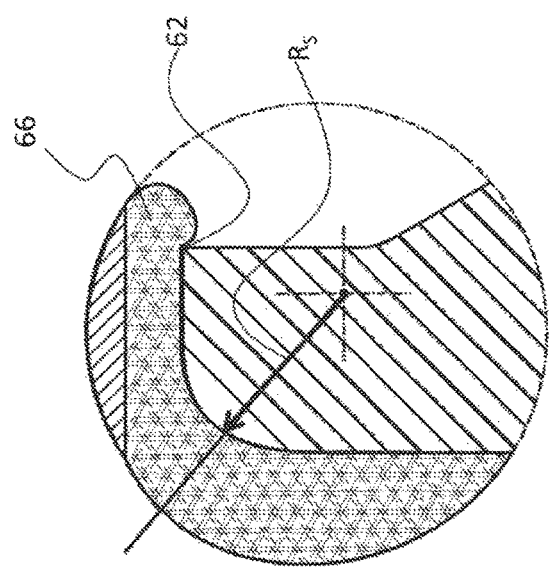
FIG. 5 is a partially detailed view of a master brake cylinder arrangement according to the prior art, in which a section corresponding to the section Y is shown.

A region of a conventional master brake cylinder arrangement corresponding to the region Y is shown for comparison in FIG. 5. In this master brake cylinder arrangement only the edge portion facing the seal element 66 is curved (radius of curvature $R_s$). However, a curvature of an edge portion facing away from the seal element is lacking. On the contrary, the edge portion facing away from the seal element 66 is sharp-edged and has a right-angled profile in the longitudinal section containing the axis. In a master brake cylinder arrangement of this kind the seal element can be damaged by a fast reset of the pressure piston 32 into its resting position, for example. In particular, a part of the seal element 66 protruding over the sharp edge 62 can be parted in the rapid resetting of the pressure piston. Due to the configuration according to the invention of the master brake cylinder arrangement 10, such damage is effectively avoided. As is evident from FIG. 6, the housing portion 17 is configured in such a way that the risk of damage to the seal element as a result of a fast reset of the pressure piston is reduced. Although the viscoelastic seal element 42 fills the gap between the housing portion 17 and the pressure piston, it advantageously only extends negligibly beyond the left edge of the right groove 18.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A master brake cylinder arrangement for a hydraulic motor vehicle brake system, comprising:

a master brake cylinder housing with a cylindrical recess and at least one substantially annular groove, which is oriented transversally to a longitudinal axis of the cylindrical recess, wherein the groove is axially delimited by a protruding housing portion, and at least one pressure piston, which is configured to be displaced axially in the cylindrical recess of the master brake cylinder housing and is guided in a sealed manner by means of at least one seal element, wherein the seal element is arranged in the groove, wherein the housing portion has an edge portion facing the seal element and an edge portion facing away from the seal element when viewed in an axis-containing longitudinal section, wherein the edge portion facing the seal element and the edge portion facing away from the seal element have a curved contour when viewed in the axis-containing longitudinal section, wherein the edge portion facing the seal element and the edge portion facing away from the seal element have differently strong curvatures.

2. The master brake cylinder arrangement according to claim 1, wherein the edge portion facing away from the seal element is more strongly curved than the edge portion facing the seal element.

3. The master brake cylinder arrangement according to claim 1, wherein the contour of the edge portion facing the seal element and the contour of the edge portion facing away from the seal element are circular when viewed in the axis-containing longitudinal section.

4. The master brake cylinder arrangement according to claim 3, wherein the edge portion facing the seal element has a first radius of curvature and the edge portion facing away from the seal element has a second radius of curvature, wherein the second radius of curvature is at most a fifth of the first radius of curvature.

5. The master brake cylinder arrangement according to claim 1, wherein the seal element consists at least in portions of a viscoelastic material.

6. The master brake cylinder arrangement according to claim 1, wherein on a side of the housing portion facing away from the groove, a further groove is formed in the master brake cylinder housing, which is configured to be brought into flow connection with a fluid compensating reservoir connection.

7. The master brake cylinder arrangement according to claim 1, wherein the edge portion facing the seal element abuts the edge portion facing away from the seal element.

8. The master brake cylinder arrangement according to claim 1, wherein a transition portion of the housing portion is formed in the direction of the longitudinal axis of the cylindrical recess between the edge portion facing the seal element and the edge portion facing away from the seal element, which transition portion extends at least in portions in a linear manner and substantially parallel to the longitudinal axis of the cylindrical recess.

9. The master brake cylinder arrangement according to claim 1, wherein a transition portion of the housing portion is formed in the direction of the longitudinal axis of the cylindrical recess between the edge portion facing the seal element and the edge portion facing away from the seal element, which transition portion has a curved contour when viewed in the axis-containing longitudinal section, wherein the transition portion is curved more strongly than the edge portion facing the seal element and more weakly than the edge portion facing away from the seal element.

10. A motor vehicle brake system with a master brake cylinder arrangement according to claim 1.

* * * * *